United States Patent
Lu

(10) Patent No.: US 10,988,048 B2
(45) Date of Patent: Apr. 27, 2021

(54) CHARGING METHOD FOR STABLY CHARGING BATTERY AND EXTENDING POWER SUPPLY PERIOD FOR ELECTRIC VEHICLE

(71) Applicant: DAR YUN ENERGY SCIENCE TECHNOLOGY CO., LTD., Taoyuan (TW)

(72) Inventor: Yung-Chi Lu, Taoyuan (TW)

(73) Assignee: DAR YUN ENERGY SCIENCE TECHNOLOGY CO., LTD., Taoyuan (TW)

( * ) Notice: Subject to any disclaimer, the term of this patent is extended or adjusted under 35 U.S.C. 154(b) by 326 days.

(21) Appl. No.: 16/237,750

(22) Filed: Jan. 2, 2019

(65) Prior Publication Data
US 2019/0202318 A1    Jul. 4, 2019

(30) Foreign Application Priority Data
Jan. 4, 2018 (TW) .................... 107100351

(51) Int. Cl.
| H01M 10/44 | (2006.01) |
| B60L 58/13 | (2019.01) |
| H02J 7/00 | (2006.01) |
| H01M 10/052 | (2010.01) |

(52) U.S. Cl.
CPC ........... B60L 58/13 (2019.02); H01M 10/441 (2013.01); H02J 7/007 (2013.01); *H01M 10/052* (2013.01); *H01M 2220/20* (2013.01)

(58) Field of Classification Search
CPC .... H02J 7/34; H02J 7/007; H02J 7/342; H02J 7/00041; H02J 7/00712; H02J 7/007188; H02J 7/0063; H01M 10/441; H01M 2220/20; Y02T 10/7072; Y02T 10/70; Y02T 90/14; B60L 53/53; B60L 50/60; B60L 58/18
USPC ........ 320/103, 110, 112, 119, 128, 134, 136, 320/137, 161–164
See application file for complete search history.

(56) References Cited

U.S. PATENT DOCUMENTS

| 10,703,211 | B2 * | 7/2020 | Chuang | .................... B60L 53/62 |
| 2009/0130538 | A1 * | 5/2009 | Kaita | ...................... B60L 58/26 |
| | | | | 429/50 |
| 2011/0266868 | A1 * | 11/2011 | Yamamoto | .............. B60L 58/21 |
| | | | | 307/24 |
| 2017/0126027 | A1 * | 5/2017 | Park | ...................... B60L 3/0046 |

* cited by examiner

*Primary Examiner* — Edward Tso
(74) *Attorney, Agent, or Firm* — Leong C. Lei

(57) ABSTRACT

A charging method for stably charging battery and extending power supply period for an electric vehicle includes: providing, according to a required voltage of a driving motor of an electric vehicle, a first battery group, which includes at least two electrically connected first batteries having a first internal resistance; separately providing at least one second battery, which has a voltage equal to a voltage of the first batteries and has a second internal resistance; electrically connecting each first battery of which a difference between the first internal resistance and the second internal resistance is less than or equal to 1.5Ω to the second battery; and charging the first battery group and the second battery, with a charging termination point being set as a voltage value of 75%-95% of an average voltage of the first battery group and a voltage value of 75%-95% of the voltage of the second battery.

4 Claims, 2 Drawing Sheets

CHARGING METHOD FOR STABLY CHARGING BATTERY AND EXTENDING POWER SUPPLY PERIOD FOR ELECTRIC VEHICLE

(a) TECHNICAL FIELD OF THE INVENTION

The present invention relates generally to a charging method for stably charging battery and extending power supply period for an electric vehicle, and more particularly to a method in which each of first batteries of which an internal resistance difference between a first internal resistance thereof and a second internal resistance is electrically connected to a second battery with a voltage value of 75%-95% of an average voltage of a first battery group formed of the first batteries being set as a charging termination point and a voltage value of 75%-95% of a voltage of the second battery being set as a charging termination point.

(b) DESCRIPTION OF THE PRIOR ART

The emerging consciousness and awareness for protecting the ecology environment brings the concept and idea of carbon reduction and energy saving to the attention of the pubic. Exploitation and use of green energy are now focus of development that all the countries around the world have been devoted to. As such, electrical vehicles are prevailing recently primarily due to the electric vehicles being driven by a power source that does not consume traditional fuel (such as fossil fuel) and thus giving off no waste gas and complying with the consciousness of carbon reduction and energy saving for protection of ecologic environmental.

An electric vehicle comprises a battery module that supplies electrical energy to a driving motor so that the driving motor may drive wheels of the vehicle coupled thereto. The driving motor converts the electrical energy into kinetic energy with which the wheels of the electrical vehicle rotate to achieve moving the electric vehicle without consuming the traditional fuel.

For such reasons, the known electric vehicle is allowed to move for a distance that is determined by the electricity storage capacity of the battery module of the electric vehicle. However, the known electric batteries for electric vehicles have only limited battery storage capacity, making it impossible for long distance movements. Compared to vehicles that consume the traditional fuel as power supply, the known electric vehicles have a cruising range that is much inferior.

In addition, a factor that prevents the known electric vehicle to get even more prevailing is that the battery modules that are used in the known electric vehicles have poor charging performance. In other words, during a charging operation of a battery module of a known electric vehicle, due to charging made to a plurality of batteries making up the battery module being not uniform, overheating may occur in some of the batteries during the charging of the battery module. This leads to a potential risk of the battery module getting exploding. In addition, the non-uniform charging of the plurality of batteries that make up the battery module may also readily lead to some of the batteries suffering excessively low level of electric energy during a discharging process of the battery module, which may eventually cause damage of the battery module.

Thus, it is desired to provide a charging method that allows for stable charging of a battery and extends a power supply period. This invention aims to provide such a solution.

SUMMARY OF THE INVENTION

In view of the above problems, the present invention provides a charging method for stably charging battery and extending power supply period for an electric vehicle. The method comprises: calculating a required voltage for a driving motor of an electric vehicle; providing a first battery group, wherein the first battery group comprises at least two or more than two first batteries that are electrically connected with each other and each of the first batteries has a first internal resistance; separately providing at least one second battery, wherein the second battery is electrically connectable with the first battery group, a voltage of the second battery being equal to a voltage of the first batteries, and the second battery has a second internal resistance; electrically connecting each of the first batteries that has an internal resistance difference between the first internal resistance thereof and the second internal resistance smaller than or equal to 1.5Ω to the second battery so as to have a total voltage of the first battery group in electrical connection with the second battery equal to the required voltage for the driving motor of the electric vehicle; finally, charging the first battery group and the second battery, with a voltage value that is 75%-95% of an average voltage of the first battery group being set as a charging termination point and a voltage value of 75%-95% of a voltage of the second battery being set as a charging termination point.

The efficacy of the present invention is that a first battery group that comprises a plurality of first batteries having an internal resistance difference between first internal resistances thereof and a second internal resistance of a second battery that is smaller than or equal to 1.5Ω is used, such that in charging, the plurality of first batteries of the first battery group and the second battery can be charged stably and uniformly; further, a voltage value that is 75%-95% of an average voltage of the first battery group is set as a charging termination point and a voltage value of 75%-95% of a voltage of the second battery is set as a charging termination point, so that during charging, the first battery group and the second battery are caused to reduce the thermal energy generated during charging; and further, during discharging, the battery capacity of the second battery serves as replenishment for the battery capacity of the first battery group so as to enhance the charging (discharging) performance of the first battery group thereby extending an available cruising range of the electric vehicle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
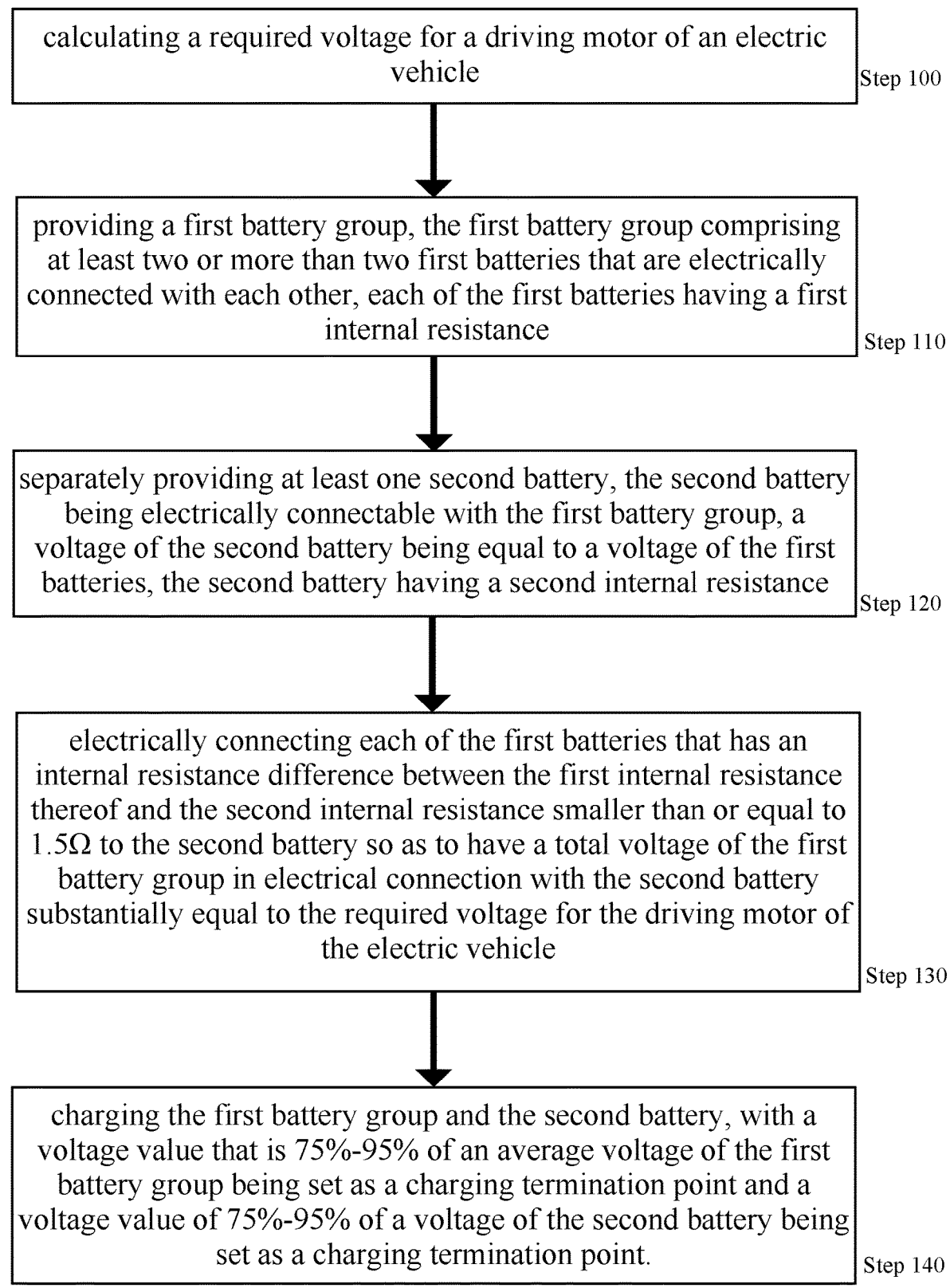
FIG. 1 is a flow chart illustrating a charging method for stably charging a battery and extending a power supply period for an electric vehicle according to the present invention.
Figure 2:
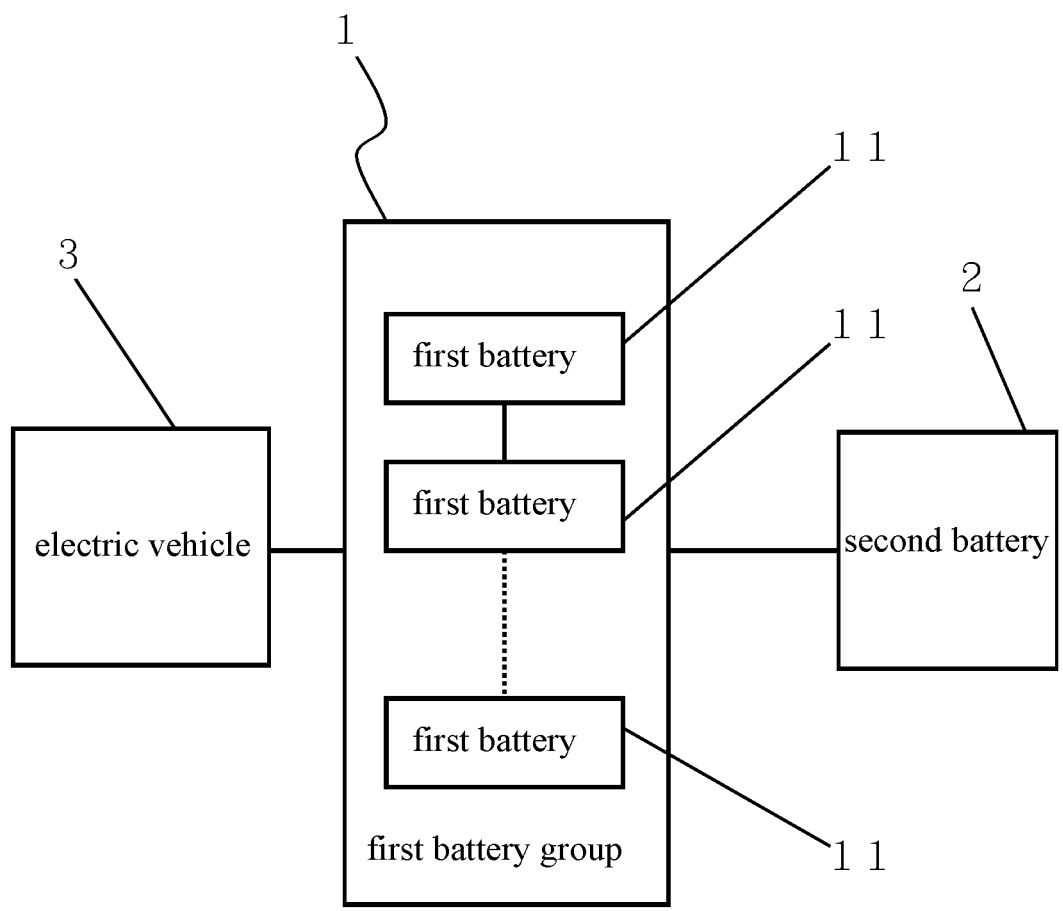
FIG. 2 is a schematic view showing a structure according to an embodiment of the present invention for stably charging a battery and extending a power supply period for an electric vehicle.

Referring first to FIGS. 1 and 2, the present invention provides a charging method for stably charging battery and extending power supply period for an electric vehicle. The method comprises:

Step 100: calculating a required voltage for a driving motor of an electric vehicle 3.

Step 110: providing a first battery group 1, wherein the first battery group 1 comprises at least two or more than two first batteries 11 that are electrically connected with each other and each of the first batteries 11 has a first internal resistance.

Step 120: separately providing at least one second battery 2, wherein the second battery 2 is electrically connectable with the first battery group 1, a voltage of the second battery 2 being equal to a voltage of the first batteries 11, and the second battery 2 has a second internal resistance.

Step 130: electrically connecting each of the first batteries 11 (of the first battery group 1) that has an internal resistance difference between the first internal resistance thereof and the second internal resistance smaller than or equal to 1.5Ω to the second battery 2 so as to have a total voltage of the first battery group 1 in electrical connection with the second battery 2 substantially equal to the required voltage for the driving motor of the electric vehicle 3.

Step 140: charging the first battery group 1 and the second battery 2, with a voltage value that is 75%-95% of an average voltage of the first battery group 1 being set as a charging termination point and a voltage value of 75%-95% of a voltage of the second battery 2 being set as a charging termination point.

In Step 130, the first internal resistances of the plurality of first batteries 11 of the first battery group 1 have an internal resistance difference therebetween that is smaller than or equal to 1.5Ω.

The plurality of first batteries 11 of the first battery group 1 have a batter capacity that is equal to a batter capacity of the second battery 2.

The first batteries 11 and the second battery 2 can be rechargeable lithium-based batteries.

In Step 140, a charging device may be used and is operated to set a voltage value that is 75%-95% of the average voltage of the first battery group 1 as a charging termination point and to set a voltage value of 75%-95% of the voltage of the second battery 2 as a charging termination point.

In summary, the technical feature of the present invention is that the first battery group 1 that comprises the plurality of first batteries 11 having an internal resistance difference between the first internal resistances thereof and the second internal resistance of the second battery 2 that is smaller than or equal to 1.5Ω and the plurality of first batteries 11 having a battery capacity equal to a battery capacity of the second battery 2 are used such that in charging the first battery group 1 and the second battery 2, the plurality of first batteries 11 of the first battery group 1 and the second battery 2 could be charged stably and uniformly so as to avoid non-uniform charging of the batteries that could lead to explosion due to a portion of the batteries being over-charged. In addition, when the first battery group 1 and the second battery 2 discharge, the plurality of first batteries 11 of the first battery group 1 and the second battery 2 could stably and uniformly discharge so as to avoid damage caused by a portion of the batteries being over-discharged. In addition, a voltage value that is 75%-95% of an average voltage of the first battery group 1 is set as a charging termination point and a voltage value of 75%-95% of a voltage of the second battery 2 is set as a charging termination point, so that during charging, the first battery group 1 and the second battery 2 are caused to reduce the thermal energy generated during charging and also to shorten the time period required for charging.

It is noted that during discharging, the first battery group 1 serves as a primary electricity supply source for the electric vehicle 3, while the battery capacity of the second battery 2 serves as replenishment for the battery capacity of the first battery group 1 so as to enhance the charging (discharging) performance of the first battery group 1 thereby extending an available cruising range of the electric vehicle 3.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A charging method for stably charging battery and extending power supply period for an electric vehicle, the method comprising:
   (1) calculating a required voltage for a driving motor of an electric vehicle;
   (2) providing a first battery group, wherein the first battery group comprises at least two or more than two first batteries that are electrically connected with each other and each of the first batteries has a first internal resistance;
   (3) separately providing at least one second battery, wherein the second battery is electrically connectable with the first battery group, a voltage of the second battery being equal to a voltage of the first batteries, and the second battery has a second internal resistance;
   (4) electrically connecting each of the first batteries that has an internal resistance difference between the first internal resistance thereof and the second internal resistance smaller than or equal to 1.5Ω to the second battery so as to have a total voltage of the first battery group in electrical connection with the second battery equal to the required voltage for the driving motor of the electric vehicle;
   (5) charging the first battery group and the second battery, with a voltage value that is 75%-95% of an average voltage of the first battery group being set as a charging termination point and a voltage value of 75%-95% of a voltage of the second battery being set as a charging termination point;

wherein during charging, charging to the first battery group is constrained in a voltage range that is 75%-95% of an average thereof and charging to the second battery is constrained in a voltage range that is 75%-95% of a voltage thereof, so that the first battery group and the second battery are stably charged and thermal energy generated during charging is reduced, and during discharging, a battery capacity of the second battery provides replenishment for a battery capacity of the first battery group to thereby enhance discharging performance of the first battery group.

2. The charging method for stably charging battery and extending power supply period for an electric vehicle according to claim 1, wherein an internal resistance difference for the first internal resistance of each of the first batteries is in the range of being smaller than or equal to 1.5Ω.

3. The charging method for stably charging battery and extending power supply period for an electric vehicle according to claim 1, wherein the first batteries have a battery capacity that is equal to the battery capacity of the second battery.

4. The charging method for stably charging battery and extending power supply period for an electric vehicle according to claim 1, wherein each of the first batteries and the second battery comprises a rechargeable lithium-based battery.

* * * * *